United States Patent Office 3,002,806
Patented Oct. 3, 1961

3,002,806
PREPARATION OF ALKALI METAL BOROHYDRIDES
Luke J. Governale, Arthur F. Limper, Jesse Roger Mangham, and Frank L. Padgitt, Baton Rouge, La., assignors to Ethyl Corporation, New York, N.Y., a corporation of Delaware
No Drawing. Filed Oct. 30, 1956, Ser. No. 619,112
4 Claims. (Cl. 23—14)

This invention relates to the preparation of alkali metal borohydrides. In particular, it is concerned with an improved process for the preparation of these chemical compounds by the reaction of an alkali metal hydride with an alkyl borate.

It has long been known that the alkali metal borohydrides can be prepared by the reaction of an alkali metal hydride with an alkyl borate. There are also other methods for the preparation of these compounds; however, this technique has been found most suitable. The process is described in U.S. Patent 2,534,533. Briefly, it comprises reacting powdered alkali metal hydride with an alkyl borate at temperatures between about 200 to 275° C. The process involves reaction of a solid with a liquid or vapor. The products of the reaction are solid. The reaction mass obtained is then extracted with a suitable solvent for the alkali metal borohydride. The slurry is filtered or otherwise treated to remove the insolubles, and then the borohydride solvent is evaporated from the alkali metal borohydride.

The above technique has been found satisfactory to a certain degree in laboratory preparations or preparations on a small scale. Since, the alkali metal borohydrides are becoming of increasing importance in many uses, it is desirable to provide a process more suitable for large scale commercial operations. For example, a major drawback to conducting the process in the above manner is that since the alkali metal hydride is a solid, incrustation occurs, and thus, yields heretofore obtainable have been of the order of about 85 to 94 percent based upon the alkyl borate. Likewise, in such an operation, which is essentially dry, agitation is difficult, and vigorous agitation is required in order to obtain efficient contact between the reactants. Even vigorous agitation does not prevent incrustation. A still further disadvantage of the technique is that the temperature is difficult to maintain, and hot spots readily develop which cause lower yield and degradation of the desired product. Still another disadvantage of this technique is that handling of the alkali metal hydride and the products of the reaction is difficult; therefore, the process does not lend itself to efficient and effective large-scale or commercial operation. Other disadvantages and problems to be overcome in the reaction of the alkali metal hydrides with the alkyl borates will be set forth as the description of the present invention proceeds.

It is therefore an object of the present invention to provide an improved process for the preparation of the alkali metal borohydrides by the reaction of an alkali metal hydride with an alkyl borate. A further object of this invention is to provide the alkali metal borohydrides in higher yield and purity than heretofore obtainable. Another object of this invention is to provide a fluidized process for the manufacture of the alkali metal borohydrides, thus providing more efficient handling of the reactants and reaction products. A specific object of this invention is to provide an efficient and economical process which combines the preparation of the alkali metal hydride, its reaction with an alkyl borate to form the alkali metal borohydride, and recovery of the alkali metal borohydride in the presence of an inert diluent in high yield and purity. Still other objects will be evident from the discussion hereafter.

The above and other objects of this invention are accomplished by providing an improved process for the preparation of alkali metal borohydrides which comprises (1) reacting a suspension of finely divided alkali metal in an essentially inert liquid diluent with hydrogen to produce a suspension of alkali metal hydride, (2) reacting said suspended alkali metal hydride with an alkyl borate to form alkali metal borohydride and by-products, (3) dissolving said alkali metal borohydride in a solvent therefor which is essentially immiscible in said inert liquid diluent and in which the by-products are essentially insoluble, and (4) separating the dissolved alkali metal borohydride phase and recovering the alkali metal borohydride therefrom. In the process of this invention as briefly set forth in the preceding statement, the reaction of the alkali metal with hydrogen is generally conducted over a temperature range between about 180 to 400° C. and a pressure between atmospheric to 500 p.s.i.g., the reaction of the alkali metal hydride with the alkyl borate is conducted at a temperature between about 200 to 350° C. and a pressure between atmospheric and 150 p.s.i.g., and the solution or extraction of the alkali metal borohydride is accomplished at a temperature between about 20° C. and 60° C. For best results it has been found that the hydriding of the alkali metal should be conducted at between about 290 to 350° C. and 25 to 150 p.s.i.g.; the alkyl borate is added to the suspension of the alkali metal hydride under the same conditions and then, after addition, is cooked at between about 250 to 320° C., and extraction of the alkali metal borohydride at between about 30 to 40° C. Particularly preferred constituents which are employed in the process of this invention are mineral oil as the inert liquid diluent, methyl borate as the alkyl borate, sodium as the alkali metal, and the dimethyl ether of diethylene glycol as the extracting liquid. One specific and preferred embodiment of this invention comprises reacting a dispersion of finely divided sodium in mineral oil having a boiling point range between 200 to 350° C. with hydrogen for a period between 30 and 120 minutes at a temperature between 290 to 350° C. and pressure of about 25 to 150 p.s.i.g., adding methyl borate vapor to the thus formed sodium hydride suspension under the same pressure and temperature conditions over a period between about 10 to 120 minutes, cooking the reaction mixture for a period between 2 to 4 hours at between 250 to 320° C., cooling the reaction slurry, filtering the solids therefrom to obtain an oil wet cake, and adding sufficient dimethyl ether of diethylene glycol to the solids to dissolve the sodium borohydride while maintaining the temperature between 30 to 40° C., separating the ether phase from the mineral oil phase, heating the ether phase to 130 to 140° C. to precipitate the borohydride, filtering the borohydride therefrom, and then evaporating the residual ether from the sodium borohydride.

The first step of the process of this invention comprises preparation of the alkali metal hydride in suspension. This operation involves suspending finely divided particles of the alkali metal in an essentially inert liquid diluent and then reacting this suspension with hydrogen. One efficient method for accomplishing the hydriding of the metal is as follows. To a reaction vessel equipped with the usual inlet and outlet ports for admission and withdrawal of products is added a prescribed proportion of inert liquid diluent. The reaction vessel is then heated to the desired temperature and agitation commenced. Next, the required amount of alkali metal is added, either in the molten state or as a solid, and a hydrogen atmosphere is maintained in the reactor until essentially all of the alkali metal has reacted.

In this step of the reaction the temperature can be varied between about 180 to 400° C. The reaction period is ordinarily of the order of ½ to 4.5 hours. The pressure employed can be from atmospheric to 500 p.s.i.g. For best results it has been found that the temperature should be maintained between 290 and 350° C. for a period between about ½ to 2.5 hours at a pressure of between 75 and 150 p.s.i.g.

Inert liquid diluents are employed in the process of this invention. In general, any inert organic liquid diluent can be employed, although the hydrocarbons are preferred. A particular criterion of choice of the diluent is that it be a liquid under the conditions of reaction. It is preferable for more efficient handling to employ as the diluent compounds or mixtures which are also liquid at room temperature. Thus, among the diluents which are employed in the process of this invention are alkanes such as the hexanes, through and including undecane, and their various branched chain and positional isomers; likewise, cycloalkanes such as propylcyclobutane, ethylcyclopentane, cyclohexane, methylcyclohexane, cycloheptane, dicyclopentyl, and the like can be employed. Additionally, aromatic diluents such as, for example, benzene, toluene, xylene, n-butylbenzene, and the like can be employed. It is to be understood that mixtures of hydrocarbons can be employed, as, for example, mixed hexanes, gasoline, naphthas, and the like. For more efficient and economical operation it is preferred to employ as the inert diluent materials having high boiling points, preferably above about 200° C., and those which are liquid at room temperature, i.e., about 25° C. Typical examples of materials of this category which can be employed are alkanes and mixtures thereof, such as dodecane, up to and including about octadecane; and cycloalkanes, such as bicyclohexyl, hexylcyclohexane, 1,3-dicyclohexylpropane, tetralin, and the like. Aromatic compounds can also be employed which include, for example, benzyltoluene, bitolyl, amylnaphthalene, and similar compounds having boiling points above 200° C. The petroleum fractions have been found particularly suitable. The petroleum fractions which we preferably employ are those having an initial boiling point above about 175° C. For example, one effective fraction is that having a boiling point range of between 200 to 350° C. Other such mixtures employed are commercial products such as "Primol-D," which is a white mineral oil having a viscosity of 335 to 345 Saybolt seconds at 100° F., and "Marcol-JX," which is a white mineral oil having a viscosity of 80 to 90 Saybolt seconds at 100° F. Still other fractions which can be employed are kerosene, diesel oil, furnace oil, gas oil, crude oil, and the like.

In general, the aforementioned diluents are employed in amount sufficient to provide fluidity of the reaction mixture. Thus, the proportion is ordinarily such that the concentration of the alkali metal hydride in the inert diluent is between about 5 to 50 percent by weight. For economy, efficient agitation, and best yields, it is preferred to employ the diluent in amount such that the alkali metal hydride will be in concentration of between about 10 to 30 percent by weight.

The next step in the process of this invention is boration of the alkali metal hydride obtained above. In conducting this step the slurry of the alkali metal hydride in the inert diluent is reacted with an alkyl borate, either as a vapor or liquid. The conditions under which this reaction is conducted can be varied over wide limits. In general, the reaction is conducted at a temperature above about 200° C. and not substantially above about 350° C. The reaction period can be varied from 15 minutes to 8 hours, and likewise, the pressure can be varied from atmospheric to about 500 p.s.i.g. For most efficient operation and best results it has been found that during addition of the alkyl borate to the alkali metal hydride, the mixture should be maintained between 290 to 320° C. at 25 to 150 p.s.i.g. and then cooked for an additional period between about 2 to 4 hours.

The alkyl borates employed are generally those having between 1 and 8 carbon atoms in the alkyl radicals. Typical but non-limiting examples of the alkyl borates employed include trimethyl, triethyl, tripropyl, triisopropyl, tributyl, and the like. The trimethyl and triethyl borates are particularly preferred because of availability and lower boiling point.

The proportion of the alkali metal hydride to the alkyl borate is generally about the stoichiometric amount as defined by the equation $$4MH + B(OR)_3 \rightarrow MBH_4 + 3MOR$$

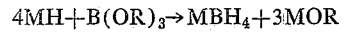

wherein M is an alkali metal and R is an alkyl radical as defined above. It has been found that higher yields are obtained when an excess of the alkali metal hydride is employed. For this reason an excess of the alkali metal hydride, between about 2 and 15 percent by weight, is preferred.

It has also been found that higher yields are obtained if an atmosphere of hydrogen is maintained during the addition of the alkyl borate to the slurry of alkali metal hydride. In general, the alkyl borate is added to the slurry when the hydriding of the alkali metal is at least 95 percent completed as evidenced by the reduction of the absorption of hydrogen. In the preferred operation the alkyl borate is added when the alkali metal is at least 98 percent hydrided. The hydrogen atmosphere is then maintained simultaneously with the feeding of the alkyl borate which, in general, is obtained over a period of 10 minutes to about 2 hours. The rate of feed of the alkyl borate will depend upon the control of the reaction temperature desired.

As indicated above, the suspension of the alkali metal is continuously agitated during its reaction with hydrogen, and likewise, the slurry of the alkali metal hydride is continuously agitated during its reaction with the alkyl borate. Agitation has been found to be important. Since both of these steps are conducted in liquid medium, more efficient agitation is achieved, thus resulting in less power requirement. The type of agitator which is preferably employed is a turbine agitator which is rotated at peripheral speeds between about 100 to 800 revolutions per minute, with the agitation sweep area being between 10 to 60 percent of the reaction zone cross sectional area and preferably at least 40 percent thereof. By this method, it has been found that shorter reaction periods for the hydrogenation are required and the alkyl borate can be fed to the slurry of the alkali metal hydride in shorter periods of time.

When the inert diluent employed is one of high viscosity, that is, above about 200 Saybolt seconds at 100° F., it has been found expeditious to add, at the completion of the reaction cycle of the alkyl borate with the alkali metal hydride, a lower viscosity diluent which is essentially completely miscible with the inert diluent employed. The hydrocarbons mentioned hereinbefore having boiling points below about 200° C. are particularly suitable when such a step is required. The dilution will also cool the reaction slurry, which is the next step in the process. With or without dilution with the lower boiling hydrocarbon, the reaction mixture is cooled to a temperature below about 100° C. It is preferred that the reaction mixture be cooled to between about 20 to 60° C. At this point in the process the slurry generally contains 70 percent by weight or more of the suspension medium.

Next, in one embodiment of the extraction operation, at least the theoretical amount of the ether solvent for the alkali metal borohydride is added and the resulting mixture agitated for a period between about 15 minutes to 2 hours while maintaining the temperature between 20 to 60° C., preferably 30 to 40° C. It has been found that the presence of the inert diluent does not hinder the recovery of the product. Although the dimethyl ether of diethylene glycol is normally quite soluble in the hydrocarbons, in the presence of the borohydride a phase separation occurs with the borohydride being contained in the ether phase. The slurry obtained upon addition of the ether solvent for the alkali metal borohydride is then subjected to filtering operations to separate the solid by-products from the mixture. Such filtration can be batch or continuous, and the residue can be washed with the extracting solvent for further solution of any residual alkali metal borohydride. The filtrate, which comprises two liquid phases, one being the extract solution and the other being the inert diluent, is then subjected to separation by decantation or other suitable technique. The inert diluent is recycled to the step of preparation of the alkali metal hydride, and if it has been diluted with a lower hydrocarbon, it can be subjected to fractional distillation to remove the lower hydrocarbon. The solution of the alkali metal borohydride is then heated to between about 100 to 150° C. to precipitate the borohydride. For optimum yield and efficiency, it is preferable to heat the extract solution to between 130 to 140° C. Temperatures appreciably below 130° C. are less desirable since the yield will be reduced and temperatures above 140° C. are not found necessary for efficient operation.

In this embodiment, generally between about 15 to 65 parts by weight of the dimethyl ether of diethylene glycol are employed per part of the alkali metal borohydride contained in the crude product slurry. For optimum efficiency, however, it is preferred to employ 50 to 60 parts of the ether per part of the borohydride.

A more advantageous procedure for the extraction operation which comprises another embodiment of the invention is to filter the reaction slurry after the completion of the boration and cooling to result in an oil wet cake containing between about 40 to 60 percent by weight of diluent. This procedure is particularly preferred since more effective utilization of the ether extractant is obtained while still maintaining easy handling of the product and effective agitation. In this instance, between about 20 to 30 parts by weight of the ether are employed per part of the borohydride contained in the oil wet cake.

In addition to the advantages of the process of this invention set forth above, a particular advantage is that the combination of the steps of the process results in essentially quantitative yields and high purity product. Generally the yields are greater than about 97 percent based upon the alkyl borate, and the purity is above 98 percent. Employing the alkali metal hydride as a slurry in the inert diluent is safer and easier to handle, and essentially no hazard is encountered if the suspension comes into contact with air during the process, although it is preferable to exclude air in all steps of this process. Another particular advantage of the process of this invention is that in all the reaction steps and during the extraction, the mixtures are in a fluidized state, thus providing more efficient agitation and flow of materials. Similarly, during the reactions, the presence of the inert diluent provides an efficient system for controlling the reaction temperature by better and uniform heat transfer throughout the reaction mixture. These and other advantages will be evident to those skilled in the art.

To further demonstrate the process of this invention, the following examples are presented wherein all parts and percentages are by weight.

*Example I*

Sodium borohydride was prepared by forming a suspension of 6780 parts of sodium and 38,300 parts of "Marcol-JX" with agitation at 420 r.p.m. in a turbine agitated reaction vessel having baffle plates spaced at 90° angles, hydrogenating the sodium at an average temperature of 310° C. and 27 p.s.i.g. for 2 hours, then reacting the sodium hydride formed with liquid trimethyl borate, 6900 parts, with a feed time of the borate of 0.3 hour and an average boration temperature of 290° C., and cooking at this temperature for 8 hours. The slurry of sodium borohydride and by-products obtained was filtered to result in an oil wet cake. This cake contained 54 percent of the "Marcol-JX" and 16.9 percent of sodium borohydride on a dry solids basis. A sample of this oil-wet cake, 107 parts, was extracted by placing it in a mixing vessel and adding 160 parts of the dimethyl ether of diethylene glycol thereto. The resulting mixture was agitated at 600 r.p.m. for 1 hour, with the temperature maintained at 35° C. The mixture was then filtered under a nitrogen atmosphere to remove the solids. The two layers contained in the filtrate were separated and the lower layer containing the borohydride was heated in another vessel to 135° C. to precipitate the sodium borohydride which was then filtered from the mixture at this temperature and dried under vacuum. The recovered sodium borohydride product had a purity of 98 percent.

*Example II*

Following the procedure of Example I with exception that the borohydride product was left suspended in the "Marcol-JX" without the filtration, the latter being present in amount of 75 percent, when 200 parts of such a slurry containing 16.9 percent by weight of sodium borohydride based on the solids weight was extracted with 470 parts of the ether without separating the two layers which formed, the product obtained assayed 94 percent.

The following example will demonstrate a particularly preferred operation of this invention.

*Example III*

To a reactor equipped with turbine agitators and baffle plates spaced at 90 degree angles is added 4,810 parts "Marcol-JX" and 850 parts sodium, the temperature, by external heating, is raised to 300° C. and the mixture agitated at 420 r.p.m. Forty-six parts of hydrogen are then pressurized in the reactor at 25 to 150 p.s.i.g. for a period of 60 minutes. Then 896 parts of trimethyl borate vapor are added to the reaction vessel employing the same pressure and temperature conditions over a period of ½ hour and the reaction mass cooked for 4 hours. The reaction mixture is then discharged and cooled to 40° C. and filtered on a rotary drum type filter. The filtrate is recycled to the aforementioned reactor. The filter cake now containing about 40 percent "Carcol-JX," 300 parts sodium borohydride, and 1,389 parts sodium methylate, is then transmitted to an extraction vessel similar to the reactor described previously and 9,060 parts of dimethyl ether of diethylene glycol are mixed therewith at 35° C. for a period of 1 hour. This mixture is then filtered with the filter cake being washed with about 1,478 parts of the ether. The filtrate is centrifuged to separate the two liquid phases and the heavy ether phase is then transmitted to a crystallizer in which it is heated to 140° C. to precipitate the sodium borohydride. The recovered sodium borohydride is then vacuum dried at 140° C. and stored for use. The waste cake from the filtering operation of the extracted reaction mass is hydrolyzed and the methanol and sodium hydroxide is recovered with the oil contained therein being recycled to the initial reactor. Likewise the ether recovered during crystallization and from separation from the oil is returned to the extractor.

In numerous runs employing this procedure, sodium borohydride is obtained of purity greater than 98 percent in overall yield, based on boron utilization, of greater than 97 percent.

Although the above examples have been demonstrated with sodium and methyl borate, it is to be understood that other alkali metals and their hydrides can be employed, as, for example, lithium, potassium, rubidium, and cesium, and their hydrides; and other alkyl borates such as triethyl, tripropyl, and the like borates can be employed. Likewise, the temperatures and pressures can be varied over the ranges set forth hereinbefore.

The products obtained according to this invention are of considerable utility. For example, when the alkali metal borohydrides are reacted with water as described in U.S. 2,534,533, rapid but safe evolution of hydrogen is obtained. They can likewise be employed for the hydrogenation of many compounds, such as ethylbenzoate, methyllaurate, benzaldehyde, and the like as described in U.S. 2,683,721. The alkali metal borohydrides can be employed for the preparation of other metal borohydrides. For example, sodium borohydride dissolved in methanol can be reacted with caustic potash to produce potassium borohydride as set forth in British Patent 730,263. Another such technique is to hydrolyze sodium borohydride and react it with caustic potash to obtain potassium borohydride as described in British Patent 717,451. These and other uses of the products of this invention will be evident to those skilled in the art.

We claim:

1. An improved process for the preparation of alkali metal borohydrides which comprises (1) reacting a dispersion of finely divided alkali metal in an essentially inert liquid diluent with hydrogen to produce a suspension of alkali metal hydride, (2) reacting said suspended alkali metal hydride with an alkyl borate to form alkali metal borohydride and by-products, (3) dissolving said alkali metal borohydride in the dimethyl ether of diethylene glycol by adding said ether to the reaction mixture containing said alkali metal borohydride and by-products suspended in said inert liquid diluent whereby two separate liquid phases form, and (4) separating the dissolved alkali metal borohydride-ether phase and recovering the alkali metal borohydride from said phase.

2. The process of claim 1 wherein said alkali metal is sodium, said inert liquid diluent is a mineral oil, said alkyl borate is methyl borate, said step (1) is conducted at a temperature between 180 to 400° C. and a pressure between atmospheric to 500 p.s.i.g., said step (2) is conducted at a temperature between about 200 to 350° C. and pressure between atmospheric and 150 p.s.i.g., and said step (3) is conducted at a temperature between 20 to 60° C.

3. The process of claim 1 wherein said inert liquid diluent is a mineral oil having a boiling point range between about 200 to 350° C., said alkali metal is sodium, said alkyl borate is methyl borate, said step (1) is conducted at a temperature between 290 to 350° C. and pressure between 25 to 150 p.s.i.g., said step (2) comprises adding methyl borate vapor at essentially the same conditions over a period between about 10 and 120 minutes, then cooking the reaction mixture at a temperature between about 250 to 320° C. between about 2 to 4 hours, and then cooling and filtering the solids therefrom to result in an oil wet cake containing between about 40 to 60 percent by weight of said mineral oil, said step (3) is conducted at a temperature between 30 to 40° C. employing between about 20 to 30 parts by weight of said ether per part by weight of the sodium borohydride, and said step (4) comprises filtering the resulting slurry to remove solids, heating the filtrate to between 130 to 140° C. to precipitate the borohydride, filtering the borohydride at this temperature, and then drying it under vacuum.

4. The integrated process for preparation of alkali metal borohydrides comprising forming a dispersion of a finely divided alkali metal in an inert liquid hydrocarbon medium, said medium including a recycle stream as hereafter defined, and treating said suspension at elevated pressures with hydrogen gas, thereby forming a suspension of alkali metal hydride in said medium, reacting said suspension with an alkyl borate, thereby forming a suspension of alkali metal borohydride and by-products in said medium, filtering said suspension and recirculating the filtrate, comprising only a part of the said medium, to the hydriding step, and recovering a filter cake including the alkali metal borohydrides, by-products, and a portion of the liquid medium, then contacting said cake with dimethyl ether of diethylene glycol and dissolving the alkali metal borohydride therein, filtering said solution and the liquid medium of the original filtered cake therefrom, then stratifying said solution and medium whereby two separate liquid phases form and removing the solution of alkali metal borohydride in said ether, then heating said solution and precipitating the borohydride and recovering the so-precipitated borohydride.

References Cited in the file of this patent

UNITED STATES PATENTS

| 2,534,533 | Schlesinger et al. | Dec. 19, 1950 |
| 2,720,444 | Banus et al. | Oct. 11, 1955 |
| 2,856,428 | Brown | Oct. 14, 1958 |

OTHER REFERENCES

"Chemical Week," vol. 78, No. 21, pages 38, 40 (May 26, 1956).

Brown et al.: "Journal of the American Chemical Society," vol. 77, page 3164 (June 5, 1955).

Schechter et al.: "Boron Hydrides and Related Compounds," prepared under Contract NO2(s) 10992 for Dept. of Navy, Bureau of Aeronautics, prepared by Callery Chemical Co., printed March 1951, decl. December 1953, page 52.

Perry: "Chemical Engineers' Handbook," 3rd Ed., 1950, pages 716, 717.